United States Patent [19]
Sutton et al.

[11] Patent Number: 5,073,036
[45] Date of Patent: Dec. 17, 1991

[54] HYDROSTATIC BEARING FOR AXIAL/RADIAL SUPPORT

[75] Inventors: Robert F. Sutton; Joseph K. Scharrer, both of Newbury Park; Robert F. Beatty, West Hills, all of Calif.

[73] Assignee: Rockwell International Corporation, El Segundo, Calif.

[21] Appl. No.: 501,576

[22] Filed: Mar. 30, 1990

[51] Int. Cl.⁵ .............................................. F16C 32/06
[52] U.S. Cl. ..................................... 384/107; 384/100; 384/108
[58] Field of Search .................. 384/100, 102, 107–111

[56] References Cited

U.S. PATENT DOCUMENTS

| | | | |
|---|---|---|---|
| 3,223,463 | 12/1965 | Porath | 384/111 |
| 3,392,995 | 7/1968 | Swerdfeger | 384/108 X |
| 3,446,150 | 5/1969 | Dee | 384/100 X |
| 3,622,213 | 11/1971 | Onsrud | 384/108 |
| 3,674,355 | 5/1970 | Yearout et al. | |
| 4,634,297 | 1/1987 | Schriwer | 384/100 |

Primary Examiner—Thomas R. Hannon
Attorney, Agent, or Firm—H. Fredrick Hamann; Harry B. Field

[57] ABSTRACT

A bearing is mounted for rotation on a shaft, the bearing having a projected area in both the axial and radial directions. A fixed bearing support housing is mounted adjacent to and spaced from the bearing and forms an annular space for a fluid flow path extending both radially and axially around the bearing to provide a hydrostatic film barrier which centers the shaft during steady state operation. A plurality of reversing fluid jets in the bearing support housing communicate with such annular space. A pair of non-rotating split rings are located forward and aft of the bearing, the split rings each having a taper angle on its inner circumferential surface. A garter spring is mounted in a recess in the outer circumference of each ring and forces the outer edge of the tapered surface into contact with a hardened surface area on the shaft or on a sleeve mounted on the shaft, to support and center the shaft in the transient state and during start-up and shut-down operations. Annular passsages communicate with the annular space around the bearing and with the space formed by the taper angle of the split rings so that when high pressure fluid flows into contact with the taper angle on the split rings, the split rings are forced out of contact with the shaft and permit rotation thereof.

16 Claims, 2 Drawing Sheets

HYDROSTATIC BEARING FOR AXIAL/RADIAL SUPPORT

STATEMENT OF GOVERNMENT INTEREST

Government has rights in this invention pursuant to Contract F04611-86-C-0103 awarded by the U.S. Department of Air Force.

BACKGROUND OF THE INVENTION

1. Field of the Invention

This invention relates to hydrostatic bearings for rotating members or shafts, and is particularly concerned with reversing jet axial/radial hydrostatic bearings for turbomachinery.

2. Description of the Prior Art

In turbomachinery hydrostatic bearings are employed to maintain a thin film of gas or liquid in a space between a shaft and a bearing member to avoid physical contact between the solid parts during operation and avoiding bearing wear as a result of operation of such a system. Thus, a suitably designed hydrostatic bearing for turbomachinery can be operated at very high speed over a long period of life.

Various devices and mechanisms have been developed for suitably mounting hydrostatic bearings. One such device utilizes suspension of the bearing by a system of radial and axial springs as disclosed for example in U.S. Pat. No. 3,674,355 to Yearout et al.

However, limited available space and flow for both axial and radial fluid film bearings and concurrent deterioration of performance of such bearings due to wear incurred during start-up and shut-down transients are present in existing turbomachinery. These detrimental factors result in more expensive, less efficient and less durable turbomachinery.

SUMMARY OF THE INVENTION

According to the invention concept, an improved hydrostatic bearing for turbomachinery is provided having a projected area in both the axial and radial directions. Such bearing provides excellent rotor dynamic support, stability and long life for transient and steady state operating conditions in turbomachines.

The invention bearing having a projected area in both the radial and axial directions is mounted on the shaft and can be of curved, tapered or stepped configuration. In the case of the preferred curved bearing member, such member has a central radially extending curved portion and a pair of forward and aft axially extending portions. The bearing is pressure fed with a fluid from a high pressure source, via a plurality of reversing jets. This configuration results in an axial/radial bearing with dynamic stability and load capacity in both radial and axial direction. Less fluid flow is required than in the case of two separate axial and radial bearings, which results in higher turbopump efficiency. The invention bearing design can be employed at the forward or pump end (driven end) and/or the aft turbine end (driving end) locations of the turbomachine.

The problem of bearing wear is resolved by the use of tapered split lift seal rings which function to center the shaft, such mechanism forming a part of the bearing assembly. Such rings are typically spring loaded to force the rings to contact and support the shaft during start-up and shut-down transients. The rings are snugly supported in the bearing housing with a touchdown clearance. These split rings are designed with a taper angle on the inner circumferential surface so that only the outer point of the taper angle makes contact with the shaft. The fluid flow through the ring tapered bore provides the centering force to minimize the contact with the shaft. These rings also function as seals to control the exact pressure on either side of the bearing and meter the flow properly.

The bearing is thus centered during the transient operations and the split rings are automatically lifted off the shaft contact surfaces during steady state operation. The shaft contact surfaces are provided with a hardened surface such as a chrome plate, to protect the shaft against undesirable wear. The fluid forces forming the bearing film act on the tapered edge of the ring to separate the ring from the shaft against the action of the spring, during steady state operation, to prevent further wear on the split rings or the mating area of the shaft. During such steady state operation the bearing will have lifted off due to the formation of a hydrostatic lubricating film, thus incurring no further wear during operation. This provides a long life, stable rotor for the turbomachine.

Thus, according to the invention, an axial and radial hydrostatic bearing for turbomachinery is provided which broadly comprises a rotatable shaft, a bearing member mounted for rotation on said shaft and having a projected area in both the axial and radial directions, a fixed bearing support housing adjacent to and spaced from said bearing member and forming an annular space defining a region for a fluid film, said space forming a fluid flow path extending both radially and axially around said bearing member to form a hydrostatic film barrier which centers the shaft, means for injecting a pressurized fluid into said annular space, a plurality of non-rotating split rings positioned around and spaced from said shaft, said rings located forward and aft of said bearing member and said bearing support housing, means for radially spring loading said split rings to force said rings into seating contact with and to support and center the shaft during start-up and shut-down of said machinery, and means forming annular passages between said rings and said shaft forward and aft of said annular space, said annular space communicating with said annular passages, whereby during steady state operation of said machinery, pressurized fluid in said annular passages forces the split rings out of contact with the shaft.

OBJECTS OF THE INVENTION

It is accordingly one object of the present invention to provide an improved hydrostatic bearing for turbomachinery.

Another object is the provision of a reversing jet axial and radial hydrostatic bearing having dynamic stability and long life.

A further object is to provide an improved hydrostatic bearing for turbomachinery of the above type, incorporating means to center the shaft and to support same during start-up and shut-down transients, and reduce wear upon the shaft during operation.

Other objects and advantages of the invention will be apparent or made obvious by the description below of certain preferred embodiments of the invention.

DETAILED DESCRIPTION OF THE INVENTION AND PREFERRED EMBODIMENTS

Figure 1:
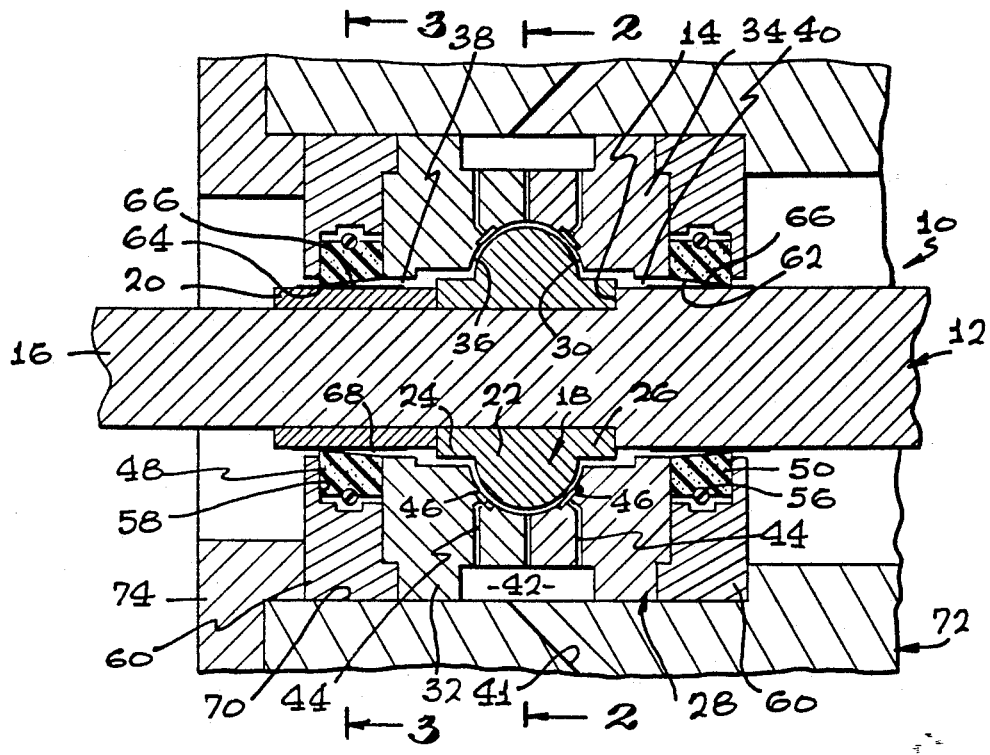
FIG. 1 is a longitudinal sectional view of a reversing jet axial/radial hydrostatic bearing according to the invention.
Figures 2, 3:
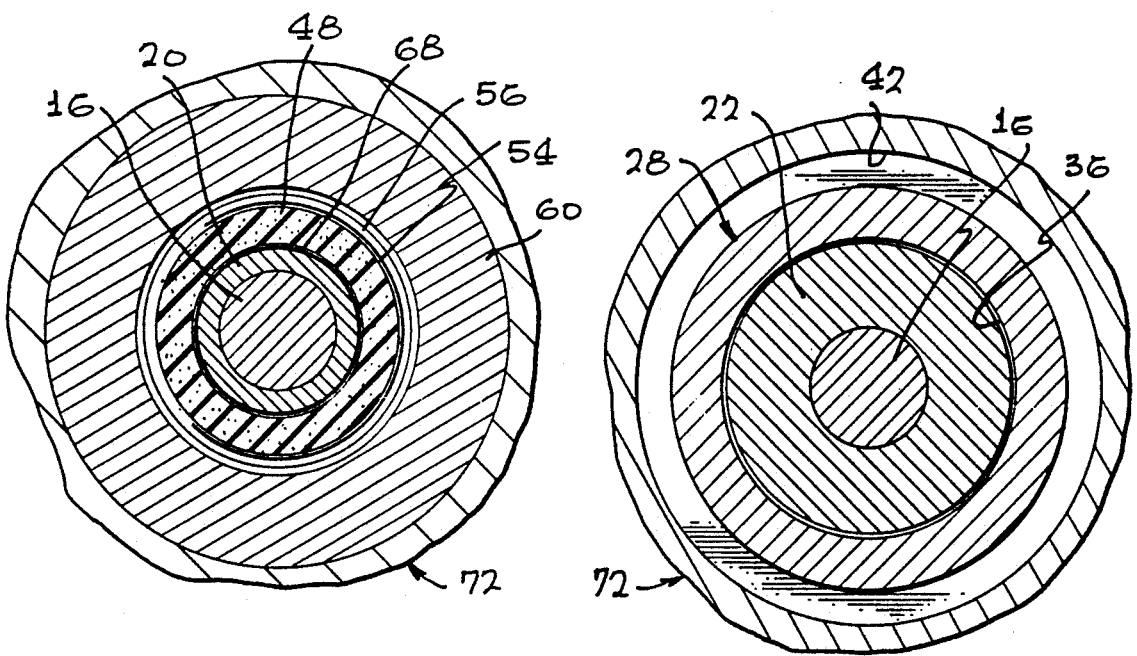
FIG. 2 is a cross sectional view of the device of FIG. 1, taken on line 2—2 of FIG. 1.
FIG. 3 is a cross sectional view taken on line 3—3 of FIG. 1.

Referring to FIGS. 1, 2 and 3 of the drawing, illustrating one preferred form of the invention bearing, numeral 10 indicates the entire bearing assembly of the invention, including a shaft 12, which is stepped at 14 to form a forward shaft portion 16 of reduced diameter, a curved radial/axial bearing 18 mounted on the reduced diameter portion 16 of the shaft and an axial positioning ring or sleeve 20 also mounted on the reduced diameter portion 16 of the shaft forward of the bearing 18.

Both the bearing 18 and the axial positioning ring 20 are fixedly mounted on the shaft for rotation therewith. The bearing 18 is retained in fixed axial position by contact of the aft end thereof with the step 14 of the shaft and by contact of its forward end with the axial positioning ring 20. It will be noted that the bearing 18 has a central radially extending curved hemispherical portion 22 and a pair of forward and aft axially extending portions 24 and 26.

Adjacent to and spaced from the bearing 18 is a bearing support housing 28 having a complimentary curved hemispherical portion 30 and forward and aft axially extending portions 32 and 34, with respect to the bearing portions 22, 24 and 26. It will be seen that the bearing support housing 28 is positioned with respect to the bearing 18 and axial positioning ring 20 so as to form a bearing clearance space 36 between the adjacent surfaces of bearing 18 and bearing support housing 28, and a forward annular axially extending passage 38 between the axial positioning ring 20 and the forward axially extending portion 32 of bearing support housing 28, and an axially extending aft annular passage 40 between the shaft 12 and the axially extending aft portion 34 of bearing support housing 28. It is seen that the annular axially extending passages 38 and 40 are in communication with the clearance space 36.

A fluid supply from a high pressure source (not shown) within the turbomachine is communicated via a conduit 41 with an annular cavity or plenum 42 around the outer periphery of the bearing support housing 28. The fluid employed can be either a gas or liquid such as air, helium gas, liquid oxygen, liquid hydrogen or liquid helium. The use of a liquid film is particularly applicable in the bearing of the present invention. From the plenum 42 the fluid passes through a series of reversing jets 44 which communicate through two rows of hydrostatic recessed pads 46, with the clearance space 36 around the curved portion 22 of the bearing 18. The fluid in the pads 46 provides a centering force against the curved portion 22 of the bearing. The fluid in the clearance space 36 forms a hydrostatic film barrier which centers the shaft 12 about its rotational axis during steady state operation. The precise injection angle and number of the reversing jets 44 between the bearing support housing 28 and the surface of the bearing 18 is optimized for each particular application, depending for example on the appropriate Reynolds number and viscosity of the particular fluid.

Figure 4:
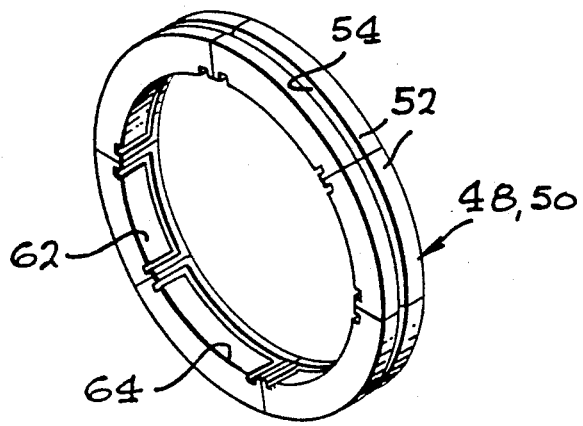
FIG. 4 is a perspective view of the split or segmented ring seals of the device of FIG. 1.

The high pressure fluid film exits the bearing clearance space 36 and is directed axially forward and aft through the annular passages 38 and 40 to a pair of split rings 48 and 50, respectively, made from a material such as carbon. The split rings 48 and 50 are of the same construction, as viewed particularly in FIG. 4, and formed of a series of arcuate segments 52. Each of the split rings 48 and 50 has a recess 54 centrally and axially positioned around the outer periphery of the ring, which receives a radial force centering loading device 56, such as a garter spring. The force centering device or garter spring 56 provides the radial load to force the split carbon rings to seat against the axial positioning ring 20 on shaft 12, in the case of the forward split ring 48, or against the shaft 12 itself, with respect to the aft split ring 50, during pre and post rotation of the shaft and during the spin-up or shut-down transient operations of the turbomachine. The split rings 48 and 50 are each installed in a cavity 58 formed between a ring support 60 and the adjacent bearing support housing 28.

Referring again to the split rings 48 and 50, it will be noted that each of such rings is tapered at 62 on the inner circumferential surface thereof, the taper angle being designed and optimized for the particular split rings employed and form the desired taper angle between the forward split ring 48 and the axial positioning ring 20, and between the aft split ring 50 and the shaft 12. When the turbomachine is in the transient condition the outer point or edge 64 of the taper angle or tapered circumference 62 of split rings 48 and 50 are in contact with the axial positioning ring 20 and the shaft 12, respectively, thus supporting and centering the shaft and the bearing 18, and preventing any initial rubbing between bearing 18 and the bearing support 28 either axially or radially, and maintaining the fluid clearance space 36 between them. The contact point 64 of the split rings 48 and 50 are also maintained in contact with the axial positioning ring 20 and the shaft 12 during initial spin-up and shut-down of the turbomachine.

A hardened surface such as a chrome plate 66 is provided on the axial positioning ring 20 and on the shaft 12 adjacent the split rings 48 and 50, to provide a durable contact surface for the contacting taper point 64 on the split rings. It will be understood that other forms of hardened surfaces can be employed.

In operation when high pressure fluid is fed to the clearance space 36 adjacent the bearing 18 and to the communicating annular passages 38 and 40, the taper angle 62 of the split rings 48 and 50 permits the high pressure fluid to pass into the space 68 between the tapered surface of the split rings 48 and 50 and the adjacent chrome plated surface 66 of axial positioning ring 20 and of shaft 12, to force the forward and aft split rings 48 and 50 to lift off the chrome plated contact areas 66 on positioning ring 20 and on the shaft 12, and permitting rotation of the shaft during steady state operation, with the split rings 48 and 50 out of contact with the shaft. The split rings 48 and 50 control the bearing 18 exit pressure for equal flow in both directions.

It is noted that the axial positioning ring 20 functions to provide axial retention of the hydrostatic bearing 18 on the shaft 12. Thus, ring 20 locks the bearing 18 in place. If the chrome plate 66 on the axial positioning ring 20 wears off, the ring 20 can be removed from the shaft 12, the chrome plate replaced and the positioning ring 20 replaced on the shaft, without removing the entire shaft for this purpose. It will be noted that at least one axial positioning ring 20 is employed to facilitate removal of the bearing, if required. If desired, a pair of positioning rings 20 can be employed, one against the aft end of bearing 18 as well as the one shown in FIG. 1 against the forward end of the bearing, with a chrome plate surface such as 66 on each such positioning ring.

The entire assembly 10 is positioned within a recess 70 of the turbomachine main housing 72, and is restrained from forward movement by the assembly contact ring 74.

Figure 5:
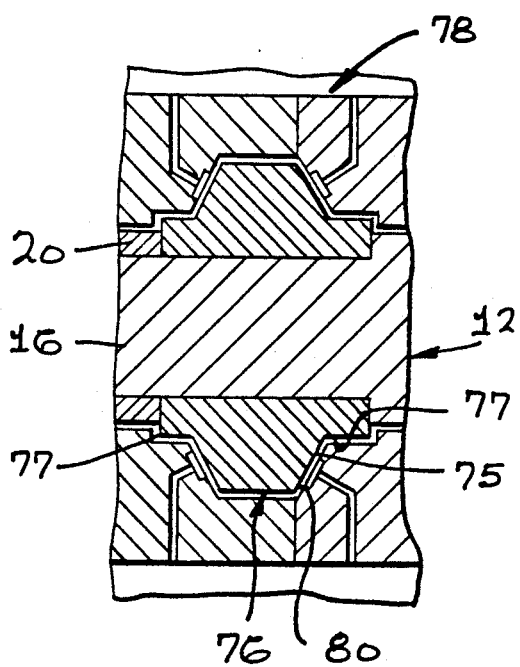
FIG. 5 is a partial longitudinal section of a modification of FIG. 1, employing a tapered bearing.

FIG. 5 illustrates a modified form of the bearing assembly of FIG. 1, utilizing a bearing 76 of tapered configuration having a central projected area 75 in the radial direction and projected areas 77 in the axial direction, and having an adjacent bearing support housing 78 of complimentary tapered configuration, and forming a clearance space 80 of trapezoidal configuration between the bearing and bearing housing.

Figure 6:
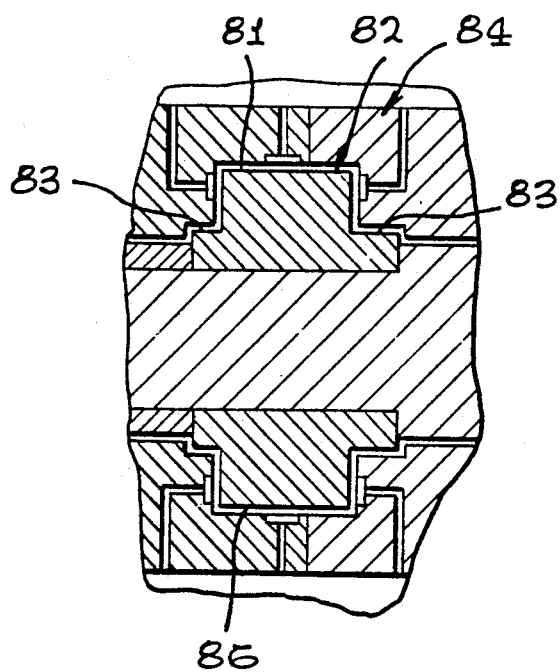
FIG. 6 is a partial longitudinal sectional view of another embodiment of the device of FIG. 1, employing a tapered bearing.

FIG. 6 illustrates a further modified form of the bearing assembly of FIG. 1, utilizing a bearing 82 of stepped configuration having a central projected area 81 in the radial direction and projected areas 83 in the axial direction, and having an adjacent bearing support housing 84 of complimentary stepped configuration, and forming a stepped clearance space 86 between the bearing and bearing support housing.

In both of the modified tapered and stepped bearings 76 and 82 of FIGS. 5 and 6, as in the case of the curved bearing 18 of FIG. 1, it is noted that such modified bearings have a projected area in both the axial and radial directions to provide lubricating fluid streams in the radial, and forward and aft axial directions.

The elements of the bearing assembly, e.g. bearing 18, bearing support housing 28, axial positioning ring 20, as well as split rings 48 and 50 can be formed of any suitable material, e.g. metal such as corrosion resistant steel, the split rings being preferably formed of a material softer than the shaft hard plated material, such as carbon.

From the foregoing, it is seen that the invention provides an improved hydrostatic bearing for turbomachinery, which is relatively inexpensive, is durable, efficient, and provides stability and radial and axial stiffness during all phases of operation, including transient and steady state conditions.

It is to be understood that what has been described is merely illustrative of the principles of the invention and that numerous arrangements in accordance with the invention may be devised by one skilled in the art without departing from the spirit and scope thereof.

What is claimed is:

1. A fluid axial and radial lubricated bearing for turbomachinery which comprises
    a rotatable shaft,
    a bearing member mounted for rotation on said shaft and having a projected area in both the axial and radial directions,
    a fixed bearing support housing adjacent to and spaced from said bearing member and forming an annular space defining a region for a fluid film, such space forming a fluid flow path extending both radially and axially around said bearing member to form a hydrostatic film barrier which centers the shaft,
    means for injecting a pressurized fluid into said annular space,
    a plurality of non-rotating split rings positioned around said shaft, said rings located forward and aft of said bearing member and said bearing support housing,
    means for radially spring loading said split rings to force said rings into seating contact with and to support and center the shaft during start-up and shut-down of said machinery, and
    means forming annular passages between said rings and said shaft forward and aft of said annular space, said annular space communicating with said annular passages, whereby during steady state operation of said machinery, pressurized fluid in said annular passages forces the split rings out of contact with the shaft.

2. The bearing of claim 1, said bearing member having a central radially extending curved hemispherical portion and a pair of forward and aft axially extending portions, and said bearing support housing having complimentary curved hemispherical and axially extending portions, to form said annular space.

3. The bearing of claim 1, including ring support means for maintaining said split rings in fixed axial position, and said spring loading means being a force-centering device positioned around the outer diameter of each of said split rings.

4. The bearing of claim 3, said force centering device being a garter spring, and including means forming a recess around the outer diameter of each of said split rings to receive said garter springs.

5. The bearing of claim 2, said radial loading means being a garter spring positioned around the outer diameter of each of said split rings, including means forming a recess around the outer diameter of each of said split rings to receive said garter springs, said split rings each having a taper angle on the inner circumferential surface thereof, the outer point of the taper angle being in operative contact with the shaft during pre and post rotation thereof and during start-up or shut-down operations, and when the high pressure fluid flows through said annular space and said annular passages into contact with the taper angle on said split rings, said split rings and the outer taper point thereon are forced out of contact with said shaft against the action of said spring loading means.

6. The bearing of claim 1, said split rings each having a taper angle on the inner circumferential surface thereof, the outer point of the taper angle being in operative contact with the shaft during start-up or shut-down operations, and when the high pressure fluid flows through said annular space and said annular passages into contact with the taper angle on said split rings, said split rings and the outer taper point thereon are forced out of contact with said shaft against the action of said radial loading means.

7. The bearing of claim 6, the shaft having a hardened surface in those areas where contact is made by the outer point of the taper angle on said split rings.

8. The bearing of claim 1, said means for injecting a pressurized fluid into said annular space being a plurality of reversing jets.

9. The bearing of claim 1, said bearing member being tapered and having a central radially projected portion and a pair of forward and aft axially projected portions, and said bearing support housing having a complimentary tapered configuration.

10. The bearing of claim 1, said bearing member having a stepped configuration and having a central radially projected portion and a pair of forward and aft axially projected portions, and said bearing support housing having a complimentary stepped configuration.

11. A reversing fluid jet axial/radial hydrostatic bearing in the main housing of a turbomachine, which comprises a rotatable shaft, a bearing mounted for rotation on said shaft, said bearing having a central radially extending curved hemispherical portion and a pair of forward and aft axially extending portions, a fixed bearing support housing mounted adjacent to and spaced from said bearing and forming an annular space defining a region for a fluid film, said space forming a fluid flow path extending both radially and axially around said bearing to form a hydrostatic film barrier which centers the shaft, said bearing support housing having complimentary curved hemispherical and axially extending portions with respect to said bearing, to form said annular space, a plurality of reversing jets in said bearing support housing and communicating with said annular space between said hemispherical portion of said bearing and of the adjacent bearing support housing, a pair of non-rotating split rings positioned around said shaft, said rings located forward and aft of said bearing and said bearing support housing, said split rings each having a taper angle on the inner circumferential surface, a ring support member for each of said split rings adjacent to said bearing support housing and maintaining said split rings in fixed axial position, said split rings each mounted in a cavity of said ring support member, a recess in the outer periphery of each of said split rings, a garter spring in the recess of each of said split rings, and forcing the outer point of the taper angle of each of said split rings into contact with and to support and center the shaft during transient and start-up or shut-down operations, and means forming annular passages communicating with said annular space and the space formed by said taper angle of said split rings, whereby when the pressurized fluid flows through said annular space and said annular passages into contact with the taper angle on said split rings, said split rings and the outer taper point thereon are forced out of contact with said shaft against the action of said garter springs.

12. The bearing of claim 11, the shaft having a hardened surface in those areas where contact is made by the outer point of the taper angle on said split rings.

13. The bearing of claim 12, wherein the material of said split rings is softer than the material of said hardened contact surface areas.

14. The bearing of claim 12, wherein said split rings are split carbon rings and said hardened surface is a chrome plated surface.

15. The bearing of claim 11, said shaft having a stepped portion of reduced diameter, and including an axial positioning ring around said reduced portion of said shaft, one of such split rings being disposed around said axial positioning ring, the outer point of the taper angle on said one of said split rings being in contact with said axial positioning ring to support said shaft during start-up or shut-down operations.

16. The bearing of claim 15, including a hardened surface on said axial positioning ring and on said shaft where contact is made by the outer point of the taper angle on said split rings.

* * * * *